No. 736,637. PATENTED AUG. 18, 1903.
A. SCHMIDT.
METHOD OF MAKING AXES, HATCHETS, OR THE LIKE.
APPLICATION FILED JAN. 3, 1903.
NO MODEL.
FIG. 1.
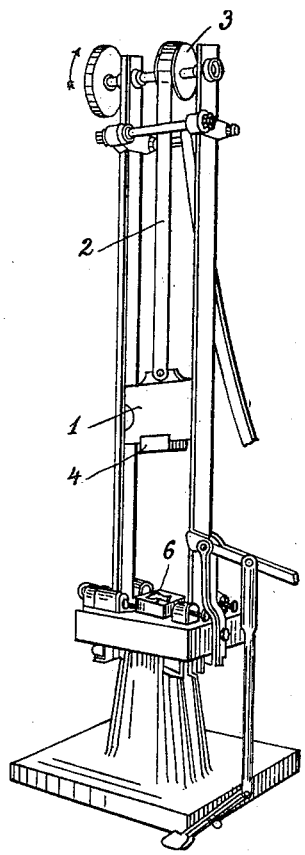
FIG. 2.
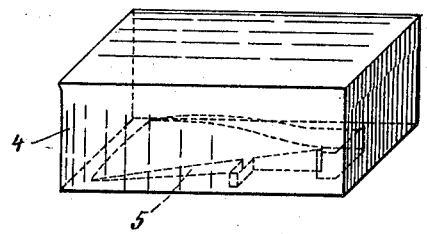
FIG. 3.
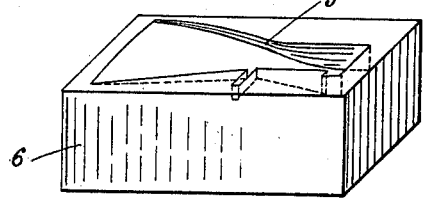
FIG. 4.
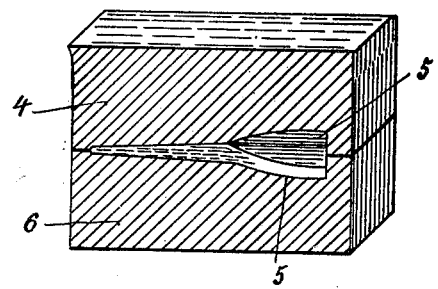
FIG. 5.
FIG. 7.
FIG. 6.
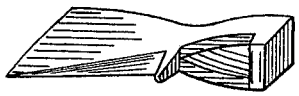
WITNESSES
H. M. Kuehne
J. M. Dowling
INVENTOR
Arthur Schmidt
BY Richardson
ATTORNEYS
THE NORRIS PETERS CO., PHOTO-LITHO., WASHINGTON, D. C.

No. 736,637. Patented August 18, 1903.

UNITED STATES PATENT OFFICE.

ARTHUR SCHMIDT, OF WARSAW-PRAGA, RUSSIA.

METHOD OF MAKING AXES, HATCHETS, OR THE LIKE.

SPECIFICATION forming part of Letters Patent No. 736,637, dated August 18, 1903.

Application filed January 3, 1903. Serial No. 137,697. (No model.)

*To all whom it may concern:*

Be it known that I, ARTHUR SCHMIDT, manufacturer, a subject of the German Emperor, and a resident of No. 391 Terespolskastrasse, Warsaw-Praga, in the Empire of Russia, have invented a certain new and useful Improved Method of Making Axes, Hatchets, or the Like, of which the following is an exact, full, and clear description.

This invention relates to a method of making axes, hatchets, and similar tools by mechanical means. The method hitherto usually adopted for making such tools by hand consisted in shaping the eye of the ax from a bent bar of flat iron, flattening out the blade, then reheating the blank and laying thereon the piece of steel, likewise made welding hot and destined for the cutting edge, and finally in welding the steel with the iron by numerous hand-hammer blows and giving the tool its final shape. Owing to the repeated heating for forging and welding purposes the above method occupied considerable time and could only be carried out successfully by an experienced and skilled workman. Attempts have been made to obviate the above drawbacks in such a manner that after the welding the shaping of the tool was effected by means of dies or matrices consisting of several parts and placed beneath forging-presses; but this method also rendered repeated heating necessary and could not prevent defective welding.

The novelty and superiority of the method forming the subject-matter of this invention are based, essentially, on the fact that the entire production of the tools, the welding as well as the shaping, is carried out in a very short time in one continuous operation by heating the pieces of iron or steel only once. This method can be carried out by the employment of power-hammers, steam-hammers, or forging-presses, which are used for forging articles on a large scale.

Referring to the accompanying drawings, Figure 1 shows by way of example such hammer with belt-gearing. Figs. 2 to 4 show the die-blocks. Fig. 5 shows the wedge-shaped mandrel adapted for forming the hammer-eye, and Figs. 6 and 7 show the preliminary and final shapes of the ax.

The hammer-block 1, Fig. 1, is suspended to a pulling strap or belt 2, passed over a pulley 3, and when the workman pulls the free end of the strap the hammer-block is raised to a suitable height, so that after slackening the tension of the strap or belt the hammer-block drops with suitable power upon the anvil. The block 1 carries below a steel die-block 4, Fig. 2, which forms at its bottom surface a matrix 5 for one half of the tool to be forged. This block 4 fits upon a steel block 6, fixed on the anvil, a die-block 5, corresponding to the other half of the tool, being recessed in the block 6, Fig. 3. If both die-blocks are properly located one upon the other, Fig. 4, they inclose a hollow space, the shape of which conforms exactly to the outer shape of the tool to be produced—for instance, the ax—as shown in Fig. 7.

In the example shown in the drawings a piece of flat iron bent in form of a loop, Fig. 6, is heated to the required temperature with a corresponding piece of welded steel 8. After the piece of steel 8 is taken out of the furnace it is placed between the bent ends of the iron bar 7, the wedge or mandrel, Fig. 5, adapted to form the hole for the handle of the ax, is inserted in the loop 7, and the blank thus formed is placed in the required manner on the matrix 5 of the die-block 6. The hammer is now set in operation and by means of the die-blocks 5 and 6 it gives the blank its final shape and at the same time effects the uniform welding of the steel blade 8 with the iron eye 7. After the forging is completed it is only necessary to force out the mandrel and to break off the projecting edge.

By the above-described method the costs of making the tools in question are considerably decreased, the finished article is much better and more uniform, and especially the welding is more intensive than is attainable by hand labor, which is so inconvenient and occupies considerable time.

Having now particularly described and ascertained the nature of the said invention, I declare that what I claim, and wish to secure by Letters Patent, is—

An improved method of making iron axes and the like consisting in first heating a piece of steel and an iron bar, bending the bar into loop form, placing the steel between the ends of the loop and placing a matrix in the loop and then while still hot forging the whole between dies at one operation, whereby a finished article is produced with only one heating.

In witness whereof I have hereunto set my hand in presence of two witnesses.

ARTHUR SCHMIDT.

Witnesses:
 CARL DYBITZ,
 WILHELM BRINGEWALD.